United States Patent
Theisen

(10) Patent No.: US 7,671,723 B2
(45) Date of Patent: Mar. 2, 2010

(54) DEVICE FOR ACTIVATING AN ACTUATOR SYSTEM FOR PROTECTING A PEDESTRIAN

(75) Inventor: Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 10/566,809

(22) PCT Filed: Jul. 8, 2004

(86) PCT No.: PCT/DE2004/001476

§ 371 (c)(1),
(2), (4) Date: Aug. 21, 2006

(87) PCT Pub. No.: WO2005/012045

PCT Pub. Date: Feb. 10, 2005

(65) Prior Publication Data

US 2007/0045026 A1    Mar. 1, 2007

(30) Foreign Application Priority Data

Jul. 30, 2003    (DE) ................... 103 34 699

(51) Int. Cl.
*B60Q 1/00* (2006.01)
(52) U.S. Cl. .............. 340/425.5; 340/940; 340/435; 340/436; 701/45
(58) Field of Classification Search ........ 340/436, 340/425.5, 435, 940; 701/45
See application file for complete search history.

(56) References Cited

U.S. PATENT DOCUMENTS

| | | | |
|---|---|---|---|
| 4,549,181 A | 10/1985 | Kiyoto et al. | |
| 6,271,747 B1 * | 8/2001 | Fendt et al. | 340/436 |
| 6,516,278 B1 | 2/2003 | Nagatomi et al. | |
| 6,678,599 B2 * | 1/2004 | Eisele et al. | 701/45 |
| 6,837,516 B2 * | 1/2005 | Miyata et al. | 280/735 |
| 7,036,621 B2 * | 5/2006 | Takafuji et al. | 340/436 |
| 7,207,410 B2 * | 4/2007 | Song et al. | 180/274 |
| 7,236,866 B2 * | 6/2007 | Takafuji et al. | 340/436 |
| 2002/0188393 A1 | 12/2002 | Fujii et al. | |
| 2003/0114985 A1 * | 6/2003 | Ishizaki et al. | 340/436 |
| 2003/0149530 A1 * | 8/2003 | Stopczynski | 340/436 |
| 2003/0159875 A1 * | 8/2003 | Sato et al. | 180/274 |

FOREIGN PATENT DOCUMENTS

| | | |
|---|---|---|
| DE | 101 40 119 | 3/2003 |
| DE | 102 52 227 | 5/2004 |
| EP | 914 992 | 10/1998 |
| EP | 0 937 612 | 8/1999 |
| GB | 2 376 118 | 12/2002 |
| JP | 2000 177514 | 6/2000 |
| JP | 2001 80545 | 3/2001 |
| JP | 2003 320912 | 11/2003 |
| WO | WO 01 34438 | 5/2001 |

\* cited by examiner

*Primary Examiner*—Eric M Blount
(74) *Attorney, Agent, or Firm*—Kenyon & Kenyon LLP

(57) ABSTRACT

A device for activating an actuator system for protecting a pedestrian is provided, the device being connected to an environment sensor system and a contact sensor system. The device compares a first signal from the contact sensor system to a threshold. The threshold or the first signal is changed as a function of a second signal of the environment sensor system and the actuator system is activated as a function of the comparison.

22 Claims, 3 Drawing Sheets

Fig. 3
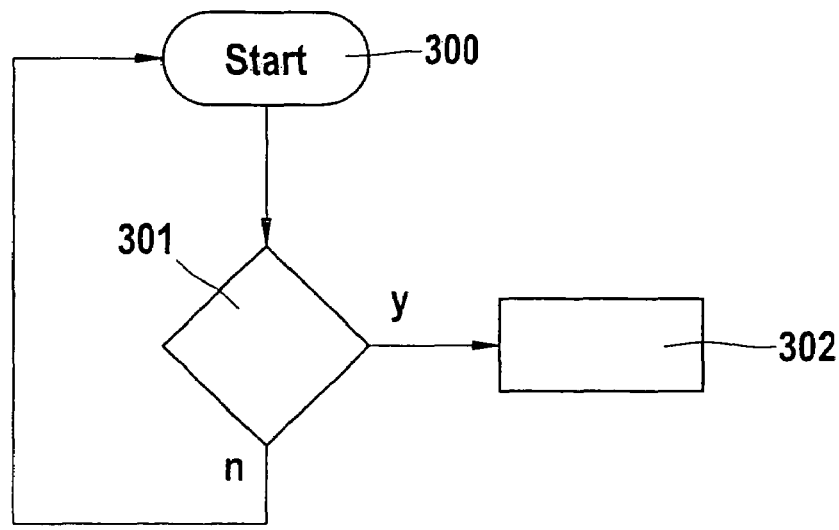
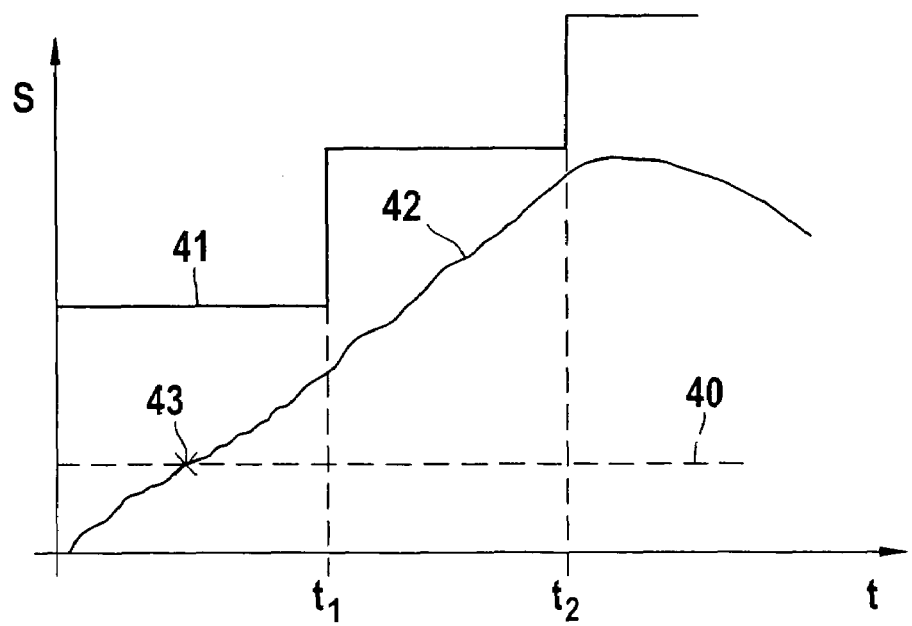
Fig. 4

DEVICE FOR ACTIVATING AN ACTUATOR SYSTEM FOR PROTECTING A PEDESTRIAN

FIELD OF THE INVENTION

The present invention relates to a device for activating an actuator system for protecting a pedestrian.

BACKGROUND INFORMATION

In a pedestrian protection system, in this case an adjustable front hood, it is known from European Published Patent Application No. 914 992 to take the vehicle's own velocity into account when activating the front hood.

SUMMARY OF THE INVENTION

By contrast, the device according to the present invention for activating an actuator system for protecting a pedestrian has the advantage that the algorithm used for activating the actuator system uses signals from an environment sensor system and a contact sensor system. Advantageously, the signal of the contact sensor system is compared to a threshold, whereupon either the signal of the contact sensor system or the threshold is changed as a function of the signal of the environment sensor system. In this manner, it is possible, for example, to take the influence of the relative speed into account in evaluating the signal from the contact sensor system. The relative speed is a measure for the classification of objects. It can be used to establish, for example, whether the relevant object is at rest or whether it moves at a certain speed. Since pedestrians, for example, only have limited maximum speed, it is easy to distinguish pedestrians from vehicles. This may then be used in particular also to take into account the severity of an accident. Thus this makes it possible for the device according to the present invention to be able to make a triggering decision for the actuator system on the basis of speed. With the aid of speed information, the impact signal becomes easier to differentiate as to whether it involves a person or another object. Including the speed thus helps to prevent a false triggering of the actuator system. Overall this results in a more precise evaluation of the impact signal, that is, the signal from the contact sensor system. For example, a fast and light object may provide a similar impact signal as a slow and heavy object. This shows that the knowledge of the speed expands the decision space by a dimension such that a classification of the different objects is improved and thereby also the decision for triggering the actuator system.

Especially advantageous is the fact that the signal of the contact sensor system, that is, the impact signal, is first compared to a noise threshold to establish when the comparison to the threshold for forming the triggering decision for the actuator system should be started. A further development provides for the noise threshold to be changed as a function of a signal of the environment sensor system. This is the case when the environment sensor system detects an impact as being highly probable or even as being unavoidable. Then, for example, the noise threshold may be lowered such that the algorithm can react more sensitively to the onset of the crash. This allows the signal processing to begin closer to the actual crash contact time.

It is furthermore advantageous that the device determines the starting point for comparing the impact signal to the threshold from another signal of the environment sensor system. For the time of the impact can be determined from the signals of the environment sensor system. This time then determines when the device begins to compare the signal from the contact sensor system to the threshold.

Furthermore, it is advantageous that the threshold is also changed as a function of time. If, for example, in a time window the threshold is not exceeded, then it is recognized that the signal from the contact sensor system probably does not indicate an impact. Consequently, the threshold can then be raised again to prevent the threshold from being exceeded by effects other than an impact. Either the signal from the contact sensor system may itself be advantageously drawn upon for the comparison or it may be used in a preprocessed version, i.e. it may be differentiated or integrated prior to the comparison so as to smoothen the signal in integration, for example, or so as to be better able to evaluate signal properties in differentiation. Differentiation or integration may be performed repeatedly.

BRIEF DESCRIPTION OF THE DRAWINGS

FIG. 3 shows a flow chart.
FIG. 4 shows a first signal timing diagram.

DETAILED DESCRIPTION

Figure 1:
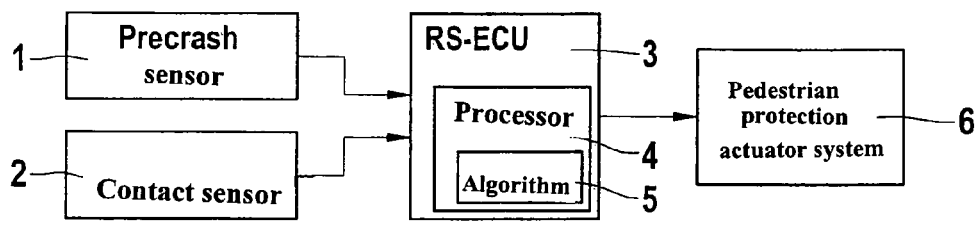
FIG. 1 shows a first block diagram of the device according to the present invention.

In today's generation of vehicles, a pedestrian in the case of an accident with a vehicle is protected merely by the fact that structural measures are taken at the front end of the vehicle. An example for this is that the front hood, the fender or the windshield are constructed in such a way that the load values for the pedestrian are as low as possible. The front hood is therefore provided at a greater distance from the engine block, for example, and may thus be designed to be softer.

These structural measures, however, e.g. for reasons of design technology, cannot be implemented in all cases and are not always sufficient. In these cases, an electronic system must be used, which controls an actuator system that offers increased pedestrian protection. An example for this is an adjustable front hood. Generally, such a system is made up of sensors, an algorithm and a control unit in which the algorithm that calculates the triggering decision is executed. As a control unit, for example, the control unit for restraint systems may be used such that the algorithm is calculated on the processor of this control unit. The present invention provides for the algorithm to take into account the speed between the vehicle and the object, i.e. in particular a pedestrian, in order to be able precisely to infer the impacting object from the impact signal, that is, the signal of a contact sensor system.

A goal of the sensor system used for the protection of pedestrians must be to measure the speed between the vehicle and the pedestrian or generally the impacting object. The speed may be detected, for example, via a precrash sensor system such as a radar or ultrasonic sensor system. Additional examples are a video sensor system, a photonic mixing device or a laser or an infrared sensor. Using this precrash sensor system, it is also possible to infer the time of the impact of the object or of the person, that is, the time at which the processing of the signal should begin. An additional goal of the sensor system must be to provide the information to the algorithm so as to distinguish between an object for which the pedestrian protection system is to be triggered or not triggered. The contact sensor is used for this purpose. Environment and contact sensor systems then provide the algorithm with the information for deciding whether the pedestrian protection system should be activated or not.

To this end, the contact sensor provides an impact signal, the increase in strength of which is directly proportional to an increase in the speed and weight of the impacting object, or the contact sensor provides an impact signal which is similar for a fast and light object to what it is for a slow and heavy object. This example shows that the knowledge of the impact speed provides the algorithm with an essential information to be able to infer the object, that is, to be able to recognize whether it is a person, for whom the protection system should be triggered, or whether it is another object, for which the system must not be activated in order to avoid other disadvantages for the vehicle or the occupants.

In order to be able to differentiate between triggering and non-triggering, it is possible, for example, to compare the impact signal or a signal derived from it with the aid of signal preprocessing, for example by a single or repeated differentiation or a single or repeated integration, to a threshold. Because of the knowledge of the relative speed it is not necessary that the threshold be independent of the relative speed; rather, the threshold may be parameterized by the speed. The impact signal, the signal of the contact sensor system, may also be parameterized in such a way. If this threshold is exceeded or undershot, the restraint device is to be triggered. Additionally, the threshold may also be time-dependent. It is equally possible to change the impact signal, or the signal derived from it, itself in a speed-dependent or time-dependent manner so as then to compare it to a threshold.

The comparison with the threshold begins either at the impact time predicted by the environment sensor system or at the time at which the impact signal has exceeded a very low threshold, the so-called noise threshold, that may be established in the application. This noise threshold may also be changed as a function of the relative speed or also as a function of the predicted impact time. A possibility for rendering the invention described here more concrete may take the form that the gradient is calculated from the impact signal of the contact sensor system. The gradient signifies the difference between the current signal sampling and the signal sampling a certain time ago, that is, for example, 2 milliseconds ago. If this gradient is greater than a speed-dependent threshold, then the actuator for the pedestrian protection is triggered.

FIG. 1 shows the device according to the present invention in a block diagram. An environment sensor system 1, in this case a combination of a radar and ultrasonic sensor system, as well as a contact sensor system 2 are connected via data lines to an airbag control unit 3. A processor 4, running at least one algorithm 5, is situated in airbag control unit 3. Algorithm 5 here is provided for activating a pedestrian protection actuator system 6 such as an adjustable front hood and/or external airbags. Pedestrian protection actuator system 6 is here shown alone, while restraint devices such as interior airbags and belt tensioners are left out here for the sake of simplicity, as are other crash and environment sensors. Environment sensor system 1 here has a radar and ultrasonic sensor system, because the radar sensor system, especially at 77 GHz is very suitable for greater distances, while the ultrasonic sensor system is suitable for close range. Alternatively, video sensors, laser or infrared sensors or a photonic mixing device are possible as well. It is also possible to use a radar sensor or an ultrasonic sensor alone. The term sensor here also applies to groups of sensor elements. Contact sensor system 2 here may be a touch sensor system such as a foil or also a piezo cable, which already via a capacitive measurement is able to provide information regarding the object, when the object has not yet collided with the vehicle. Other touch sensors such as sensor strips or fiber optic sensors are possible here as well. The algorithm processes the signals of environment sensor system 1 and contact sensor system 2 in order to trigger pedestrian protection actuator system 6 as a function of these signals. For this purpose, the signal of the contact sensor system is compared to a threshold. Pedestrian protection actuator system 6 is triggered as a function of the threshold comparison. The threshold or the signal of contact sensor system 2 is changed as a function of the signal of environment sensor system 1.

Figure 2:
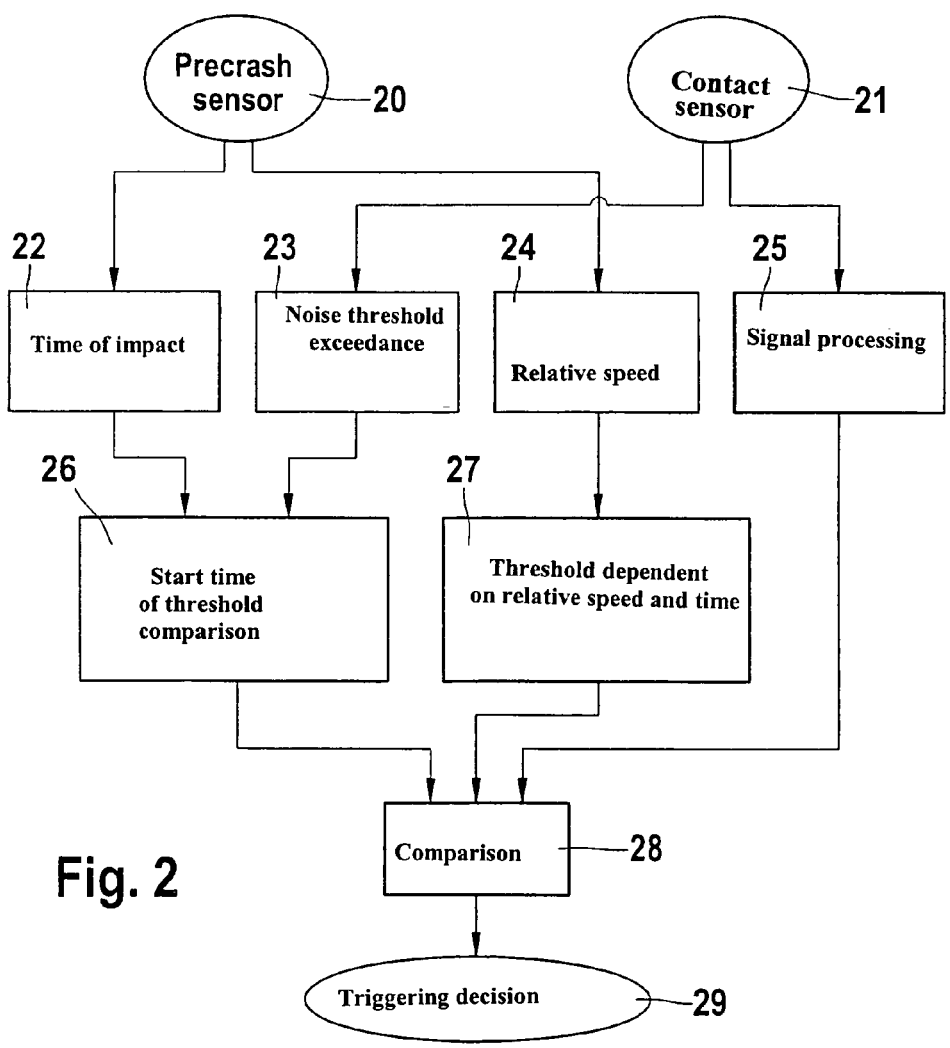
FIG. 2 shows a signal flow chart.

FIG. 2 explains the different possibilities allowed for by the signals of contact sensor system 2 and environment sensor system 1. The signal of contact sensor 21 is once sent to a noise threshold exceedance 23, that is, whether the signal of contact sensor system 2 reaches a value that prompts the assumption that it concerns an impact and not a noise signal. The signal of contact sensor system 21 may also be sent to a signal preprocessing 25, in which this signal for example sent to a single or repeated integration or differentiation. Signal 20 of the environment sensor system may be used to determine the time of impact 22, that is, as a function of the distance and the relative speed. The relative speed 24 itself is used to change threshold 27 as a function of relative speed 24. Threshold 27 is also changed as a function of time, as shown above. The starting point of threshold value comparison 26 may be determined either from impact time 22 or from noise threshold exceedance 23. It is possible to use signal 20 for adjusting the noise threshold. Comparison 28 then leads to triggering decision 29. Usually this is ascertained by an exceedance of the threshold. It is also possible, however, in the case of negative signals for example, to ascertain this in the event of an undershooting.

FIG. 3 shows the execution of algorithm 5 in a flowchart. In method step 300, algorithm 5 is started, either as a function of the impact time calculated from the signal of the environment sensor system or if the noise threshold has been exceeded. In method step 301, the comparison of the signal of contact sensor system 2 with the threshold is then performed. The threshold or the signal of contact sensor system 2 is changed as a function of a signal of environment sensor system 1. This signal is preferably the relative speed. If the threshold value is exceeded or the result of the comparison necessitates an activation of the actuator system for pedestrian protection, then the system jumps to method step 302 to trigger the actuator system. If the comparison does not yield such a result, then the system jumps back to method step 300 in order to ascertain whether the algorithm is started again.

Figure 5:
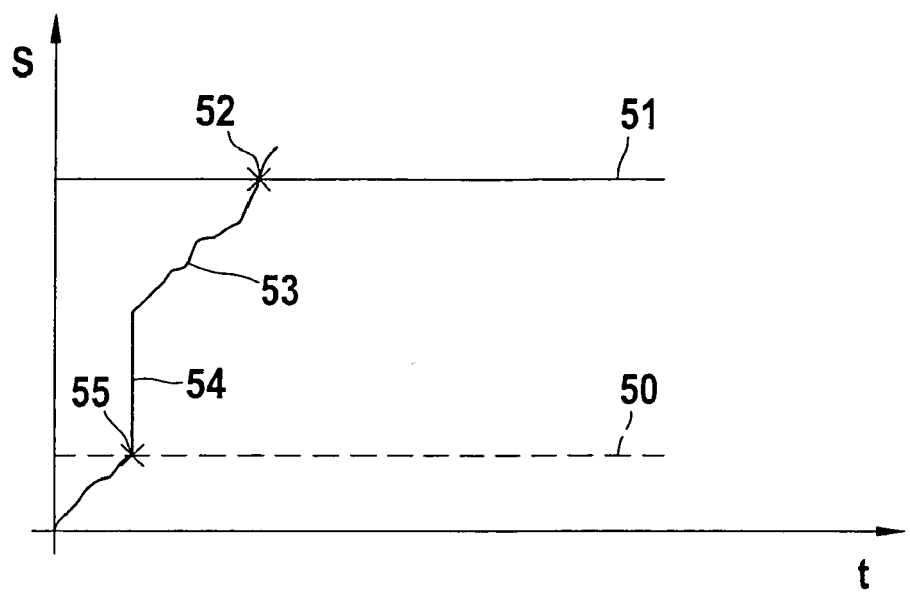
FIG. 5 shows a second signal timing diagram.
Figure 6:
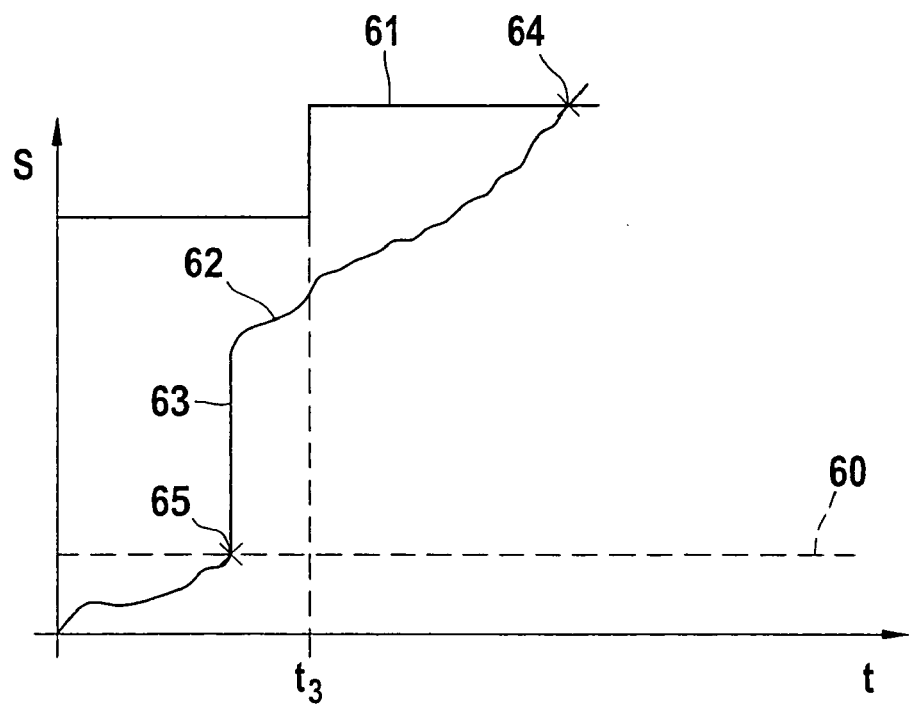
FIG. 6 shows a third signal timing diagram.

FIGS. 4 through 6 show exemplary constellations for the threshold value comparisons. Time is in each case represented on the abscissa, while on the ordinate S designates the signal. Here signal 42 of contact sensor system 2 is compared to a threshold 41. First, however, signal 42 is compared to a noise threshold 40. At time 43, noise threshold 40 is exceeded such that algorithm 5 starts at that point. First threshold 41 is at a low level, yet the threshold is not exceeded until time t1. Hence, at time t1, threshold 41 is raised by a certain amount. Since signal 42 also does not reach threshold 41 by time t2, threshold 41 is raised further. This shows that a triggering is prevented if signal 42 does not exceed the threshold fast enough. The starting level of threshold 41 is set as a function of the relative speed that was ascertained by environment sensor system 1. Noise threshold 40 may also be set as a function of a signal of environment sensor system 1, for example via the calculation of the impact time.

FIG. 5 shows signal 53 which is compared to a threshold 51 which only varies with time. At time 55, signal 53 exceeds noise threshold 50. Now signal 53 is increased by the amount of 54 as a function of the relative speed. At time 52 then threshold 51 is exceeded and therefore pedestrian protection actuator system 6 is activated.

FIG. 6 shows a combination of a changed signal having a time-dependent threshold. The threshold is fixed here from the initial amount or it may also be set as a function of the relative speed. At time 65, signal 62 exceeds noise threshold 60. Immediately, an addition 63 is made to signal 62 as a function of the relative speed. Nevertheless, signal 62 does not reach threshold 61 by time t3. Therefore, threshold 61 is raised at time t3. At time 64, signal 62 then finally reaches threshold 61 and pedestrian protection actuator system 6 is triggered.

What is claimed is:

1. A device for activating an actuator system for protecting a pedestrian, the device being connected to an environment sensor system and a contact sensor system, the device, comprising:
    an arrangement for performing a first comparison of a first signal from the contact sensor system to a threshold;
    an arrangement for comparing the first signal to a noise threshold to ascertain a staffing point for the first comparison;
    an arrangement for changing one of the threshold and the first signal as a function of a second signal of the environment sensor system, the actuator system being activated as a function of the comparing; and
    an arrangement for changing the threshold in response to passage of a predetermined amount of time.

2. The device as recited in claim 1, wherein the first signal itself is used for the first comparison.

3. The device as recited in claim 1, further comprising:
    an arrangement for one of differentiating and integrating the first signal for comparison at least once.

4. The device as recited in claim 3, wherein the first signal itself is used for the first comparison.

5. The device as recited in claim 1, wherein the second signal includes a relative speed.

6. The device as recited in claim 5, further comprising:
    an arrangement for one of differentiating and integrating the first signal for comparison at least once.

7. The device as recited in claim 5, wherein the first signal itself is used for the first comparison.

8. A device for activating an actuator system for protecting a pedestrian, the device being connected to an environment sensor system and a contact sensor system, the device comprising:
    an arrangement for performing a first comparison of a first signal from the contact sensor system to a threshold;
    an arrangement for changing one of the threshold and the first signal as a function of a second signal of the environment sensor system, the actuator system being activated as a function of the comparing;
    an arrangement for comparing the first signal to a noise threshold to ascertain a staffing point for the first comparison; and
    an arrangement for determining a starting point for the first comparison from a third signal of the environment sensor system.

9. The device as recited in claim 8, further comprising:
    an arrangement for setting the noise threshold as a function of the third signal.

10. The device as recited in claim 8, further comprising:
    an arrangement for one of differentiating and integrating the first signal for comparison at least once.

11. The device as recited in claim 8, wherein the first signal itself is used for the first comparison.

12. The device as recited in claim 10, wherein the first signal itself is used for the first comparison.

13. A device for activating an actuator system for protecting a pedestrian, the device being connected to an environment sensor system and a contact sensor system, the device comprising:
    an arrangement for performing a first comparison of a first signal from the contact sensor system to a threshold;
    an arrangement for changing one of the threshold and the first signal as a function of a second signal of the environment sensor system, the actuator system being activated as a function of the comparing; and
    an arrangement for determining a starting point for the first comparison from a third signal of the environment sensor system.

14. A device for activating an actuator system for protecting a pedestrian, the device being connected to an environment sensor system and a contact sensor system, the device comprising:
    an arrangement for performing a first comparison of a first signal from the contact sensor system to a threshold;
    an arrangement for changing one of the threshold and the first signal as a function of a second signal of the environment sensor system, the actuator system being activated as a function of the comparing; and
    an arrangement for changing the threshold in response to passage of a predetermined amount of time, wherein the threshold is raised after passage of the predetermined amount of time without detection of an impact.

15. The device as recited in claim 14, wherein the second signal includes a relative speed.

16. The device as recited in claim 14, further comprising:
    an arrangement for one of differentiating and integrating the first signal for comparison at least once.

17. The device as recited in claim 14, wherein the first signal itself is used for the first comparison.

18. The device as recited in claim 15, further comprising:
    an arrangement for one of differentiating and integrating the first signal for comparison at least once.

19. The device as recited in claim 18, wherein the first signal itself is used for the first comparison.

20. The device as recited in claim 15, wherein the first signal itself is used for the first comparison.

21. A device for activating an actuator system for protecting a pedestrian, the device being connected to an environment sensor system and a contact sensor system, the device comprising:
    an arrangement for performing a first comparison of a first signal from the contact sensor system to a threshold; and
    an arrangement for changing the threshold as a function of a second signal of the environment sensor system, the actuator system being activated as a function of the comparing;
    wherein the threshold is changed as a function of an impact time predicted based on the second signal.

22. The device as recited in claim 21, wherein the second signal includes a relative speed.

* * * * *